(12) United States Patent
Frisch

(10) Patent No.: US 7,784,825 B2
(45) Date of Patent: Aug. 31, 2010

(54) VEHICLE STEERING WHEEL WITH A GAS BAG MODULE

(75) Inventor: Ralph Frisch, Moembris (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 270 days.

(21) Appl. No.: 11/505,084

(22) Filed: Aug. 16, 2006

(65) Prior Publication Data

US 2007/0045996 A1   Mar. 1, 2007

(30) Foreign Application Priority Data

Aug. 24, 2005   (DE) .................. 20 2005 013 383 U

(51) Int. Cl.
    *B60R 21/203* (2006.01)
(52) U.S. Cl. .................... 280/731; 200/61.55
(58) Field of Classification Search ................. 280/731; 200/61.54, 61.55
    See application file for complete search history.

(56) References Cited

U.S. PATENT DOCUMENTS

| | | | |
|---|---|---|---|
| 5,593,178 A * | 1/1997 | Shiga et al. | 280/731 |
| 5,755,458 A * | 5/1998 | Donovan | 280/728.2 |
| 5,971,429 A | 10/1999 | Bramberger et al. | |
| 6,139,051 A * | 10/2000 | Fujita | 280/731 |
| 6,626,459 B2 * | 9/2003 | Takimoto et al. | 280/731 |
| 6,639,160 B2 * | 10/2003 | Ibe et al. | 200/61.54 |
| 6,820,894 B2 * | 11/2004 | Lim et al. | 280/731 |
| 6,840,537 B2 * | 1/2005 | Xu et al. | 280/731 |
| 6,860,509 B2 * | 3/2005 | Xu et al. | 280/731 |
| 7,159,898 B2 * | 1/2007 | Thomas | 280/731 |
| 7,398,994 B2 * | 7/2008 | Poli et al. | 280/731 |
| 7,566,071 B2 * | 7/2009 | Tsujimoto et al. | 280/731 |
| 2004/0217580 A1 | 11/2004 | Schorle et al. | |

FOREIGN PATENT DOCUMENTS

| | | |
|---|---|---|
| DE | 6970707615 | 8/2002 |
| DE | 20316519 | 4/2004 |
| GB | 2390337 | 1/2004 |
| JP | 200212115 | 1/2002 |

OTHER PUBLICATIONS

Machine translation of JP Publication No. 2002-012115 A.*

* cited by examiner

*Primary Examiner*—Paul N Dickson
*Assistant Examiner*—Nicole Verley
(74) *Attorney, Agent, or Firm*—Tarolli, Sundheim, Covell & Tummino LLP

(57) ABSTRACT

A vehicle steering wheel includes a gas bag module (16) and an immovably fastened component (18), in particular a shield, adjacent to the gas bag module (16). The vehicle steering wheel further includes at least one separate elastic positioning element (22) which establishes the position of the gas bag module (16) relative to the adjacent component.

7 Claims, 2 Drawing Sheets

VEHICLE STEERING WHEEL WITH A GAS BAG MODULE

TECHNICAL FIELD

The invention relates to a vehicle steering wheel comprising a gas bag module.

BACKGROUND OF THE INVENTION

Fastening a gas bag module to a vehicle steering wheel entails difficulties owing to the high requirements with respect to the positioning of the gas bag module. An inaccurate positioning of the gas bag module results not only in different gap measurements but can also lead to undesired noises through bearing friction or knocking of the gas bag module. Furthermore, the addition of the manufacturing tolerances of the components involved (cumulative tolerance) leads to projections and gaps which are difficult to control. This applies in particular to so-called floating horn gas bag modules, which are movable with respect to adjacent components of the vehicle steering wheel. Solutions known hitherto for positioning such gas bag modules are generally costly and cumbersome.

It is an object of the invention to provide a vehicle steering wheel, in which the gas bag module is easy to install and is automatically positioned correctly.

BRIEF SUMMARY OF THE INVENTION

In accordance with the invention, a vehicle steering wheel comprises a gas bag module and an immovably fixed component, in particular a shield, adjacent to the gas bag module. The vehicle steering wheel further comprises at least one separate elastic positioning element which establishes the position of the gas bag module relative to the adjacent component. The elastic positioning element presses the gas bag module into the desired position without further action, so that even in the case of a floating horn gas bag module a correct position is always reached after each actuation of the horn. The positioning elements, which can be small in size, therefore form a noise-free guide for the gas bag module. This makes small, controllable gaps and projections possible. The positioning elements are exchangeable and can be designed for various requirements.

The positioning element may be used advantageously for the production of a horn contact for activating the horn. To this end, the positioning element may act on a horn contact element.

According to a preferred embodiment of the invention, the positioning element is a spring element having a support section and a detent section, the support section having a U-shaped profile with two arms, and the detent section being connected with one of the arms. In accordance with a favourable arrangement, in this construction of the positioning element the detent section can engage on the gas bag module, and the support section can be arranged between the adjacent component and a support.

The positioning element is preferably designed so that it exerts a pre-stressing force onto the gas bag module in the axial direction of the vehicle steering wheel and/or in a perpendicular direction to the axial direction of the vehicle steering wheel, so that in addition to the spatial positioning, the positioning element according to the invention also provides for an actuating force and a restoring force when the horn is actuated, and vibrations of the gas bag module are avoided.

The positioning of the gas bag module by the positioning element according to the invention preferably represents a supplement to a primary fastening mechanism which is independent of the positioning element.

A correct positioning of the gas bag module in all directions perpendicular to the steering wheel axis can be achieved most simply by at least three positioning elements distributed over the periphery of the gas bag module.

DETAILED DESCRIPTION OF THE PREFERRED EMBODIMENT

Figure 1:
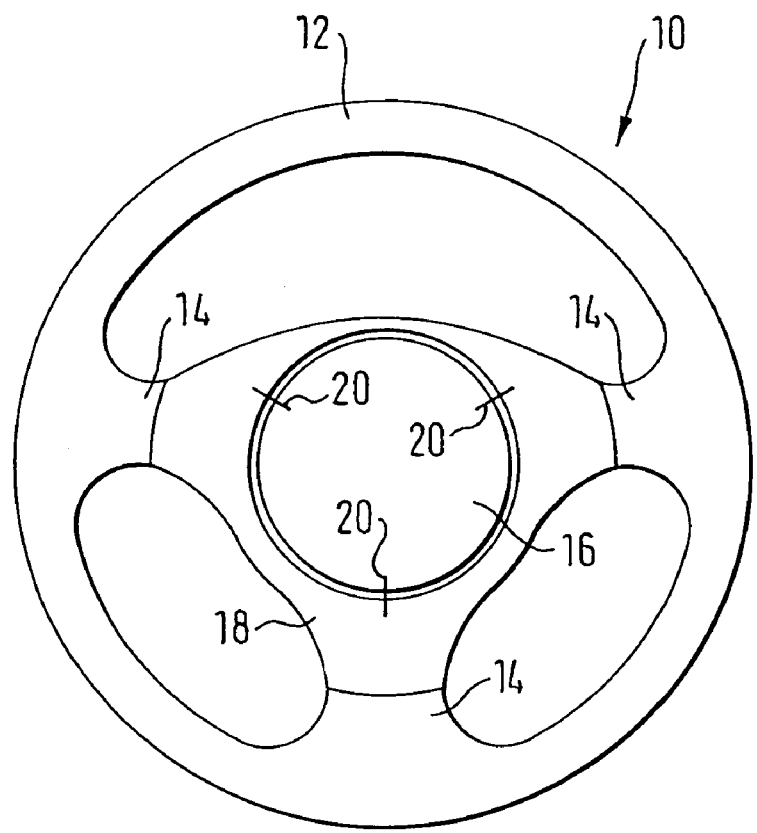
FIG. 1 shows a top view of a vehicle steering wheel according to the invention.

In FIG. 1 a vehicle steering wheel 10 is shown with a steering wheel rim 12, spokes 14 and a centrally arranged gas bag module 16. The gas bag module 16 is constructed as a so-called floating-horn gas bag module, i.e. the entire gas bag module can be pressed down in the axial direction of the vehicle steering wheel 10 in order to actuate the horn. The gas bag module 16 is surrounded by a shield 18 which is fastened immovably on the vehicle steering wheel 10.

Special elastic positioning elements 22 are provided at three sites 20 for positioning and guiding the gas bag module 16 in relation to the immovable components of the vehicle steering wheel 10, in particular to the adjacent shield 18. The positioning elements 22 are arranged substantially at the same angular distance from each other on the outer periphery of the gas bag module 16.

Figure 2:
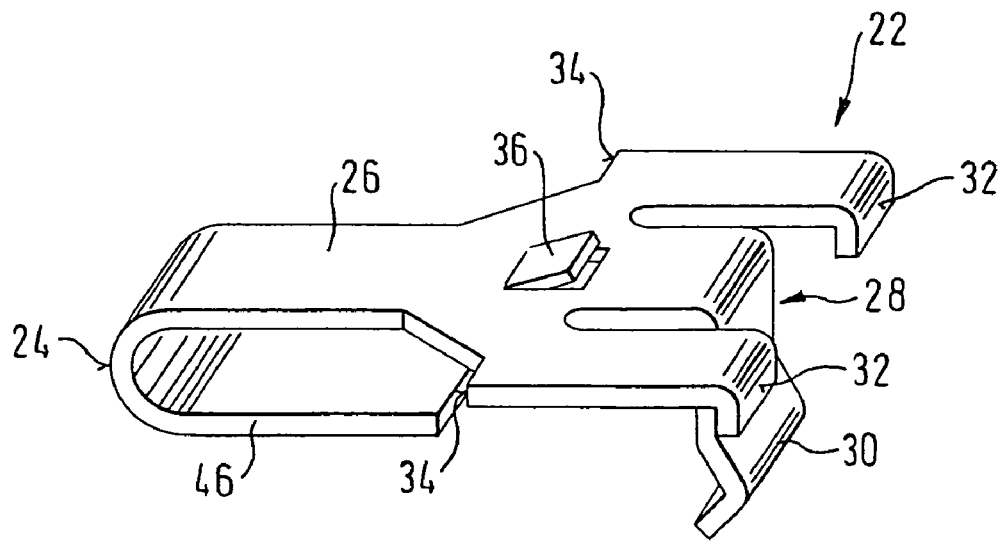
FIG. 2 shows a perspective view of a positioning element.

FIG. 2 shows a single positioning element 22. The positioning element 22 is a spring element and has a support section 24 with a U-shaped profile. A detent section 28 with an angled tongue 30 adjoins the upper arm 26 of the U-shaped section. The positioning element 22 has, in addition, first fitting sections 32 and opposed second fitting sections 34 and also an upwardly bent nose 36.

Figure 3:
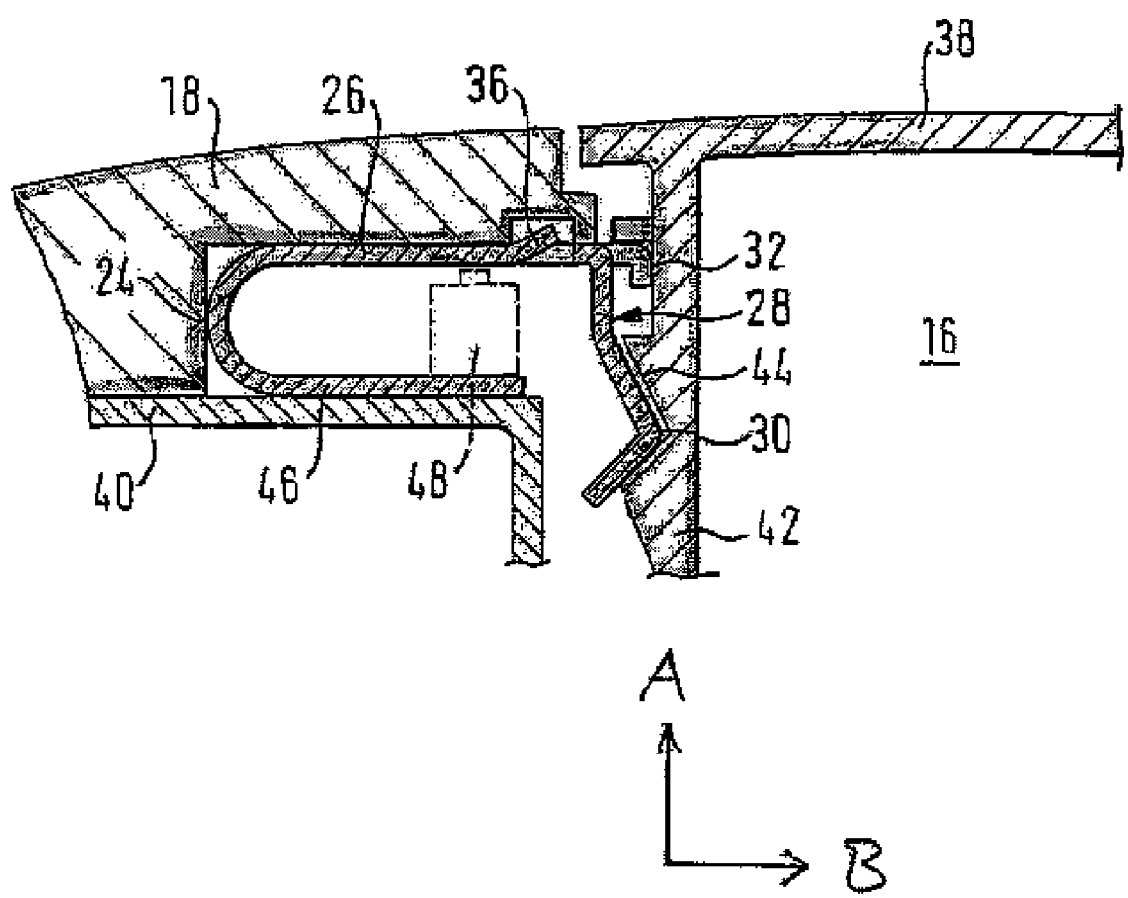
FIG. 3 shows a section through a portion of the vehicle steering wheel of FIG. 1.

In FIG. 3 the vehicle steering wheel 10 is illustrated in the installed state, in which the shield 18 and the covering cap 38 of the gas bag module 16 lie opposite each other. The gas bag module 16 is fastened to the vehicle steering wheel 10 by means of a primary fastening mechanism (not shown) which is independent of the positioning elements 22. In particular, the primary fastening mechanism is a detent mechanism. In the case of an activation of the gas bag module 16 the shooting forces are transferred to the vehicle steering wheel 10 via this primary connection. The positioning elements 22, on the other hand, serve for the spatial positioning and guiding of the gas bag module 16.

As shown in FIG. 3, the positioning elements 22 are arranged so that the support section 24 is held in a cut-out of the shield 18 and rests on a support 40. The nose 36 engages into a matching cut-out of the shield 18, whilst the first fitting sections 32 rest against a side wall 42 of the covering cap 38 and the second fitting sections 34 rest against the shield 18. In this way, a force-fitting fixing of the gas bag module 16 is provided in a plane perpendicular to the steering wheel axis.

The detent section 28 of the positioning element 22 with the angled tongue 30 and the contour 44 of the side wall 42 of the covering cap 38 are coordinated with each other so that the covering cap 38 engages with the positioning element 22 by pushing in axially (secondary detent engagement). The form- or force-fitting axial fixing by the secondary engagement is designed so that a repeated installation and dismantling of the covering cap 38 is possible. The free tongue 30 of the detent section 28 is pre-stressed in the installed state, i.e. it exerts a force onto the covering cap 38 and hence onto the gas bag module 16, which has a component in the axial direction, indicated at A in FIG. 3, and a component in a direction perpendicular thereto, indicated at B.

When several positioning elements 22 are used, this results as a whole in a defined positioning of the gas bag module 16 relative to the adjacent shield 18 with a pre-stressing which counteracts vibrations of the movable gas bag module. Compression springs or suchlike which are otherwise usual for damping vibrations can therefore be dispensed with.

If the gas bag module 16 is pressed down in axial direction to actuate the horn, the positioning element 22, with the exception of the lower arm 46, also moves practically without friction. The fitting sections 32, 34 and the detent section 28 provide for a guidance and an actuating force or restoring force, in order to offer a certain resistance to the movement of the gas bag module 16 and in order to move the gas bag module 16 back again into the initial position.

The actuating of the horn can take place with the aid of a horn contact element 48 which is arranged on the lower arm 46 of the positioning element 22, on the support 40 or on another component beneath the shield 18, as illustrated in dashed lines in FIG. 3. By the gas bag module 16 being pressed down, the upper arm 26 of the positioning element 22 is moved onto the horn contact element 48 and thereby produces an electrical contact for activating the horn.

The positioning elements 22 therefore fulfil several functions: The force-fitting spatial fixing of the gas bag module 16, the pre-stressing of the gas bag module 16 to avoid vibrations, the guiding of the gas bag module 16 when the horn is actuated and also the establishing of the actuating force and the provision of the restoring force when the horn is actuated.

The invention claimed is:

1. A vehicle steering wheel, comprising a gas bag module and a shield being immovably fastened on the steering wheel adjacent to and surrounding the gas bag module, the vehicle steering wheel further comprising at least one separate elastic positioning element which establishes the position of a covering cap of the gas bag module relative to the adjacent shield, the positioning element being made in one piece and designed so that it exerts a pre-stressing force onto the gas bag module in an axial direction of the vehicle steering wheel and in a direction perpendicular to the axial direction of the vehicle steering wheel, wherein the positioning element comprises a support section with a U-shaped profile which is held in a cut-out of the shield, first fitting sections resting against a side wall of the wall of the covering cap, and opposed second fitting sections resting against the shield.

2. The vehicle steering wheel according to claim 1, wherein the gas bag module is a floating-horn gas bag module.

3. The vehicle steering wheel according to claim 1, wherein the positioning element acts on a horn contact element.

4. The vehicle steering wheel according to claim 1, wherein the U-shaped section of the positioning element has two arms and wherein a detent section is connected with one of the arms.

5. The vehicle steering wheel according to claim 4, wherein the support section is arranged between the adjacent shield and a support separate from the gas bag module and the adjacent shield.

6. The vehicle steering wheel according to claim 4, wherein the detent section of the positioning element engages the side wall of the covering cap of the gas bag module.

7. The vehicle steering wheel according to claim 4, wherein the detent section has an angled tongue engaging a contour of the side wall of the covering cap of the gas bag module.

* * * * *